(No Model.)
W. CRABB.
PORTABLE CRIB FOR FEEDING CATTLE AND HOGS.
No. 463,857. Patented Nov. 24, 1891.
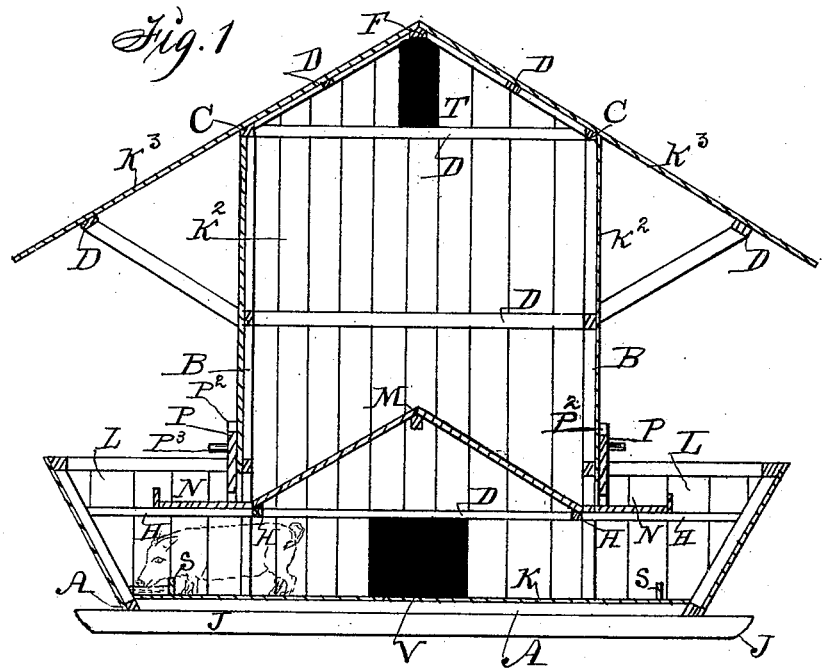
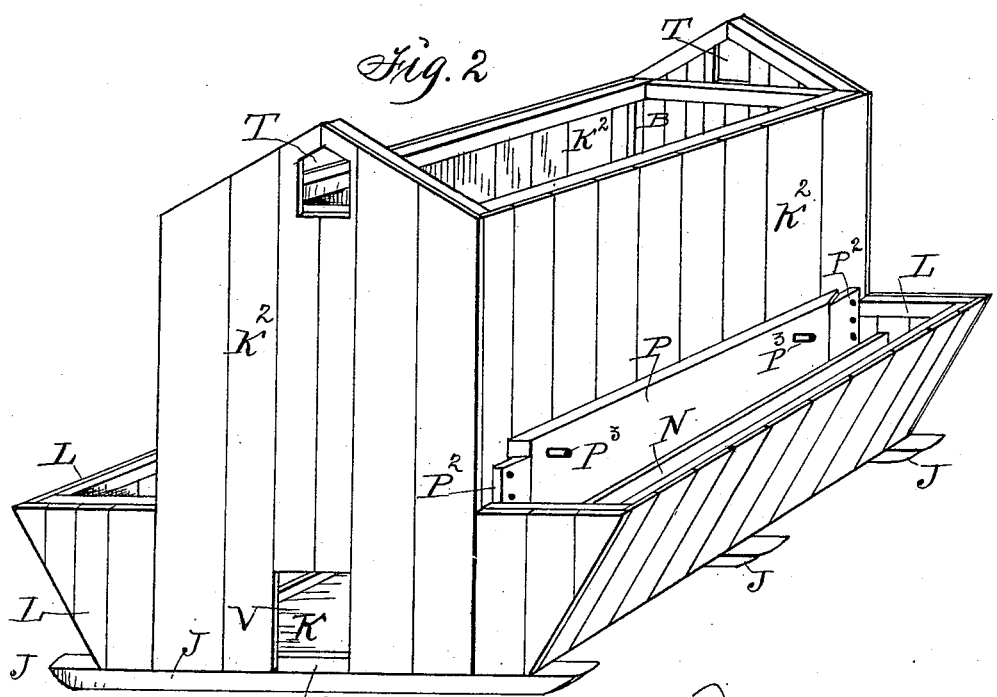
Witnesses:
Inventor: William Crabb,
By Thomas G. Orwig, Atty.

UNITED STATES PATENT OFFICE.

WILLIAM CRABB, OF PERCY, IOWA.

PORTABLE CRIB FOR FEEDING CATTLE AND HOGS.

SPECIFICATION forming part of Letters Patent No. 463,857, dated November 24, 1891.

Application filed January 31, 1891. Serial No. 379,844. (No model.)

*To all whom it may concern:*

Be it known that I, WILLIAM CRABB, a citizen of the United States of America, residing at Percy, in the county of Marion and State of Iowa, have invented an Improved Portable Crib for Feeding Cattle and Hogs, of which the following is a specification.

My invention consists in the arrangement and combination of a crib, a pig-sty, open-topped lateral extensions, troughs for cattle, and troughs for hogs, as hereinafter set forth, in such a manner that the feed will descend from the crib into the cattle-troughs and the waste from the cattle through the open-topped extensions into the hog-troughs.

In the accompanying drawings, Figure 1 is a transverse sectional view showing a roof over the crib, and Fig. 2 is a perspective view showing the roof removed therefrom.

My complete feeding device is preferably built of wooden materials fastened together by pins, nails, and bolts in a common way, and consists in the following-described parts: sills A, posts B, plates C, nailing-ties D, a ridge-beam F, and auxiliary supports H, so arranged and joined together as to make a suitable frame, as shown, and may vary in size and shape, as desired, and mounted upon runners J to admit of ready transportation.

K is a floor fixed to the upper side of the sills A and the intervening joists or sleepers.

$K^2$ is the outer covering of the walls of the crib, and $K^3$ is the covering of the roof thereof.

L are the open-topped lateral extensions at the sides of the crib and pig-sty adapted to inclose feed-troughs.

The bottom of the crib consists of a double-inclined plane M, adapted to direct the feed in opposite directions from the center of the crib into troughs N, formed on and extending in a horizontal plane from the lower edges thereof. The said bottom M and the troughs N are mounted on auxiliary supports H and form the roof of the hog-sty.

The flow of the feed into the troughs N is regulated by gates P, mounted and adapted to slide up and down within bearings $P^2$.

$P^3$ are pins inserted in perforations in the end portions of the gates and adapted to be used in elevating the gates and to be inserted in perforations in the wall-covering $K^2$ to hold the gates in a stationary position, as required, to regulate the flow of feed.

S represent the inner walls of troughs adapted to contain feed for hogs, the opposite sides being formed by the inclined sides of the extensions L, and the bottom formed by the floor K.

T represent openings through which feed may be placed in the crib, and V represent openings through which hogs may pass on entering or emerging from the sty.

In the practical use of my invention the cattle obtain their feed from the troughs N, and a considerable quantity of feed is dropped and slides down the inclined inner side of the extension L and lodges in the lower trough and is eaten by the swine in the sty. It will thus readily be seen that by the use of my invention the hogs are protected from the cattle and from rain and cold. The feed also is protected and is kept clean and pure.

I do not desire to be understood as limiting my invention to feeding of cattle and hogs, as it is equally as well adapted for horses and sheep, mules, and calves, or other animals of different sizes.

I claim as my invention—

1. A crib for storing feed and feeding cattle and hogs, having an elevated inclined floor, an open-topped lateral extension at the lower edge of the inclined floor, a trough for cattle in the top portion of the said extension, and a trough for hogs in the lower portion of the said extension, the latter trough arranged to receive the feed dropped over the edge of the upper trough, all arranged and combined to operate in the manner set forth.

2. A crib having an elevated floor inclined in opposite directions from its center to produce the roof of a pig-sty, open-topped lateral extensions at the sides of the crib and sty, troughs for feeding cattle, extended through the top portions of the said extensions and the wall of the crib, having openings leading thereto to allow feed to descend from the inclines of the floor into said troughs, and troughs for feeding hogs, extended through the lower portions of the said extensions and adapted to receive the waste dropped over the edges of the upper troughs by the cattle, all arranged and combined in the manner set forth, for the purposes stated.

WILLIAM CRABB.

Witnesses:
J. C. YATES,
J. H. WOODWARD.